(12) United States Patent
Benedict

(10) Patent No.: US 10,943,318 B2
(45) Date of Patent: Mar. 9, 2021

(54) RAIL CAR TERMINAL FACILITY STAGING PROCESS

(71) Applicant: Albert James Benedict, Calgary (CA)

(72) Inventor: Albert James Benedict, Calgary (CA)

(73) Assignee: Amsted Digital Solutions Inc., West Chester, PA (US)

( * ) Notice: Subject to any disclaimer, the term of this patent is extended or adjusted under 35 U.S.C. 154(b) by 323 days.

(21) Appl. No.: 15/170,283

(22) Filed: Jun. 1, 2016

(65) Prior Publication Data

US 2017/0349195 A1    Dec. 7, 2017

(51) Int. Cl.
| | | |
|---|---|---|
| *G06Q 50/28* | (2012.01) | |
| *B65G 63/00* | (2006.01) | |
| *B61L 25/02* | (2006.01) | |
| *B61L 27/00* | (2006.01) | |

(52) U.S. Cl.
CPC ............ *G06Q 50/28* (2013.01); *B61L 25/025* (2013.01); *B61L 27/0005* (2013.01); *B61L 27/0016* (2013.01); *B61L 27/0022* (2013.01); *B61L 27/0027* (2013.01); *B61L 27/0077* (2013.01); *B65G 63/008* (2013.01)

(58) Field of Classification Search
CPC ............... G06Q 50/28; B61L 27/0005; B61L 27/0016; B61L 27/0022; B61L 27/0027; B61L 27/0077; B61L 25/025; B65G 63/008
See application file for complete search history.

(56) References Cited

U.S. PATENT DOCUMENTS

| | | | | |
|---|---|---|---|---|
| 3,991,889 | A * | 11/1976 | Cox | B61B 1/005 414/339 |
| 6,148,291 | A | 11/2000 | Radican | |
| 6,175,784 | B1 * | 1/2001 | Jicha | B61L 3/125 188/107 |
| 6,439,128 | B1 * | 8/2002 | Miller | B61B 1/005 104/27 |
| 8,045,962 | B2 | 10/2011 | Schullian et al. | |
| 2006/0047379 | A1 * | 3/2006 | Schullian | G06Q 10/08 701/19 |
| 2008/0297322 | A1 * | 12/2008 | Krener | G06Q 10/087 340/10.4 |
| 2014/0236957 | A1 * | 8/2014 | Rieppi | G06Q 50/30 707/741 |
| 2016/0068173 | A1 * | 3/2016 | Fuchs | B61L 15/0027 340/994 |

* cited by examiner

*Primary Examiner* — Behrang Badii
(74) *Attorney, Agent, or Firm* — Adrian D. Battison; Ade & Company, Inc.; Michael R. Williams

(57) ABSTRACT

In a method or apparatus for transporting bulk goods by rail cars on a rail network to a rail car handling terminal where the handling terminal includes a loading and/or unloading system with a metering device for measuring an amount of the bulk goods loaded or unloaded. At the terminal there is a center control data hub connecting to a plurality of portable hand held field computers and a communication system for communication with the rail network to obtain a Car Location Message (CLM), a way bill and mechanical data for each of the rail cars. The center control hub generates data indicating a current stage of each of the railcars and a signal indicative that a rail car can be transferred from one stage to another stage to the portable computers to control transfer of the rail car from one stage to the next stage.

13 Claims, 4 Drawing Sheets

RAIL CAR TERMINAL FACILITY STAGING PROCESS

This invention relates to a method and technology to monitor and to measure the locations, the status, the staging, the sequencing of operations and the movements of rail cars and other vehicles ("the vehicle") into, through and out of rail car operations terminals.

BACKGROUND OF THE INVENTION

There are over 2 million rail cars in North America. About 500,000 rail cars are involved in the transportation of hazardous cargo, which is loaded and offloaded at thousands of rail terminals.

Rather than using the current manual and paper-based inspection system, which is prone to errors and delays, the rail industry is seeking computerized solutions to tracking rail cars through their terminals, capturing all data elements and storing in a secure environment.

The rail car terminal provides a facility for the loading, offloading, handling and storage of rail cars which may include loading and unloading stages and also possibly a transloading stage which is the process of transferring product or cargo from one vessel to another, such as to or from a rail car, tanker truck, pipeline, storage tank, barge or other containers. Transloading may also involve the measurement of the transfer, including such parameters as weight, volume, temperature, density, product components and more.

SUMMARY OF THE INVENTION

It is an object of the present invention to provide an improved method and apparatus for controlling the stages through which the cars pass during their operations in the rail car handling terminal.

According to the invention there is provided a method for transporting bulk goods comprising:

providing a plurality of rail cars arranged to be transported on a rail network to a rail car handling terminal;

each rail car having unique identification indicia identifying the rail car;

at the handling terminal providing an apparatus for loading into and/or unloading the bulk goods from each of the rail cars, the apparatus including a metering device for measuring an amount of the bulk goods loaded or unloaded;

at the handling terminal providing a plurality of portable hand held field computers, each comprising:

an input interface for manual input by a worker of data relating to the rail cars;

a display for displaying data to the worker;

a camera module for obtaining images of the rail cars by the worker;

at the handling terminal providing a center control data hub in communication with the said apparatus and said portable computers;

communicating from said center control hub to a communication system of the rail network to obtain from the communication system a Car Location Message (CLM) for each of the rail cars prior to arrival of the rail cars at the rail car handling terminal;

communicating from said center control hub to a communication system of the rail network to obtain from the communication system a way bill for each of the rail cars prior to arrival of the rail cars at the rail car handling terminal;

the center control hub obtaining, from a data base using the unique identification indicia, mechanical data relating to each of the rail cars including at least a weight and capacity of the rail car;

at the handling terminal establishing a plurality of stages of operation on the rail cars, the stages including at least the following:

arrival from rail network, loading/unloading;

storage;

cleaning and/or repair;

release to rail network;

in between at least some of the stages causing the worker to carry out an inspection of the rail car and to enter data relating to the inspection into the input interface of the portable computer;

the center control hub generating data indicating a current stage of each of the railcars in the rail car handling terminal;

the central control hub providing a signal indicative that a rail car can be transferred from one stage to another stage based on at least some of the data relating to the Car Location Message, the way bill, the mechanical data and the inspection;

the central control hub communicating the signal indicative that a rail car can be transferred from one stage to another stage to the portable computers to control transfer of the rail car from said one stage to said next stage.

The Car Location Message (the "CLM") is a data message in the form of a single line of text that captures the events in the staging of a railcar to, within and departure from a facility. The CLM data message is a composite of several data elements, including but not limited to a) rail car identification code; b) load or empty status; c) state or situation of rail car, such as arrived, placed or released; d) date and time of CLM event; e) the stage event code; f) the source of the information of the event, such as the railroad, the trackside scanner or the hand held computer device; and g) other information that may be related to the CLM event.

The CLM message itself has been in the industry for over a century, dating back to the days of telegraph. However, the creation and use of CLM's for staging of rail cars within the rail car handling terminal is unique. That is the process of the present invention includes as a key point the creating a CLM upon a rail car moving from one stage to another. This is part of the uniqueness of this application.

Preferably the portable hand held field computers further include as part of the camera module, video and audio, and also a system for GPS location capture.

Sometimes the transfer from one stage to another includes physical movement of the rail car. However in other cases the transfer can occur without any movement of the rail car. That is the rail car remains at a stationary location and passes through the different stages at that location. Where a physical step such as unloading is necessary, the rail call is typically moved to an unloading station.

At the rail car terminal there can be provided a first apparatus for loading rail cars and a second apparatus for unloading rail cars. In this case the terminal is used for both unloading the car and reloading the cars with a different material. However in some circumstances the terminal may include only unloading or only loading.

As part of the control system, preferably the center control hub provides a signal allowing operation of a loading apparatus. That is the railcar concerned is allowed to pass to the loading station under the control of the centre control hub depending upon that car meeting the necessary requirements to enter that stage.

Typically the center control hub controls the loading apparatus by providing a signal indicative of an amount of bulk goods to be metered to a full condition of the rail car. In some cases the center control hub controls metering to fill of a rail car by communicating fill information to the hand held computers so that the filling system is controlled and monitored by the worker in response to the signals to the computer. In other cases the center control hub controls metering to fill of a rail car by controlling a filling meter of the loading apparatus.

As part of the release stage, preferably the center control hub creates bill of lading for the rail cars prior to release of the rail car from the release stage of the rail car handling terminal to the rail network.

As part of the release stage, preferably the center control hub creates a Car Location Message (CLM) for each rail car prior to release of the rail car from the release stage of the rail car handling terminal to the rail network.

As part of the arrival stage, preferably the center control hub creates a Car Location Message (CLM) internal to the rail car handling terminal for each rail car prior to release of the rail car from the arrival stage into the rail car handling terminal and upon transition from each stage to the next.

In some cases there are optionally provided track side scanners at or in advance of the rail car handling terminal for reading data from each rail car including a location, way bill and Car Location Message (CLM). However these can be omitted and the operation carried out using the information from the rail network and from the inspections at the arrival stage. Where the track side scanners are used, the Car Location Message (CLM) can be used to provide advance information on arriving rail cars in advance of arrival at the arrival stage.

Preferably during the inspection the worker is required to enter into input interface inspection details relating to a mechanical condition of the rail car, a confirmation that the rail car inspected is the correct car and a confirmation of the load contained by the rail car inspected. Other information may also be included.

In order to carry out this inspection, preferably the input interface of the portable hand held field computer creates an inspection check list for the worker.

As part of the control process, the center control hub preferably provides signals allowing loading of a rail car dependent on information relating to a previous load obtained from the previous way bill. That is, the information previously received by the communication system concerning the previous way bill of the railcar concerned gives information concerning whether the commodity to be loaded into the railcar is compatible with the prior contents. In other cases where the commodities are compatible, the center control hub acts to verify the cargo compatibility and permit the railcar to be loaded without requiring the cleaning stage. In the case that the cargo to be loaded is not compatible with prior contents, the center control hub will not allow loading to take place without passing through the cleaning stage.

That is that, in some cases, the center control hub provides signals requiring cleaning of a rail car prior to loading dependent on information relating to a previous load obtained from the previous way bill.

In some cases, depending upon on inspection, the center control hub provides signals allowing transfer of a rail car to the storage stage dependent on information from the inspection including a requirement for repair and/or an off-lease condition of the rail car.

Preferably as one part of a display protocol, the center control hub generates an output on said display providing data relating to all rail cars in the rail car handling terminal and their current stage.

Preferably as another part of the display protocol, the center control hub generates an output on said display providing data relating at least some of the stages and the identification of the rail cars in those stages.

Preferably the center control hub stores for each rail car in the release stage information relating to identification of the rail car, load in the rail car, inspections carried out on the rail car and photographs of inspected parts of the rail car, together with geographical location on each railcar at each stage, and date/time stamp of arrival at each stage. This information is maintained in a storage or memory for subsequent release in the event of a dispute or question concerning the condition of the railcar at a subsequent time.

As another part of the system, preferably the center control hub maintains a list of customer orders. As part of this system the center control hub selects for each customer order a rail car dependent upon mechanical data obtained from the data base and the previous load obtained from the waybill.

The stages defined above may include the following sub-stages:

Arrival:
SL—Shipper Loaded
Railcar provided by a shipper has arrived at the serving rail carrier yard and has cargo. The terminal has been notified that it is available for placement at the plant.
RL—Railcar Loaded
The user's railcar has arrived at the serving rail carrier yard and has cargo. The terminal has been notified that it is available for placement at the plant.
CE—Customer Empty
Railcar provided by a customer has arrived at the serving rail carrier yard and is empty. The terminal has been notified that it is available for placement at the plant.
RE—Railcar Empty
The user's railcar has arrived at the serving rail carrier yard and is empty. The terminal has been notified that it is available for placement at the plant.
PR—Product Return—Loaded in Plant
Railcar is being received back at the serving rail carrier yard and has cargo. This is typically caused by rejection of product by a customer due to off-specification or due to an over-weight car blockage by a rail carrier. The terminal has been notified that it is available for placement at the plant.
PL—In-Plant Loaded
Railcar has been actually placed in the plant by the serving railroad and has cargo.
PE—In-Plant Empty
Railcar has been actually placed in the plant by the serving railroad and is empty.
Loading Unloading:
UL—Unloading
Railcar has been positioned for offloading of cargo or is already offloaded.
LD—Loading
Railcar has been positioned for loading of cargo or is already loaded, but not yet billed out.
LH—Load and Hold
Railcar has been loaded with cargo and is to be held for assignment of order.

TL—Transloading
Transferring product or cargo from one vessel to another, such as to or from a rail car, tanker truck, pipeline, storage tank, barge or other containers.
Release:
BL—Billed Loaded
Railcar inside the terminal has cargo and now has a bill of lading. It is scheduled to depart on the next serving carrier switch.
BE—Billed Empty
Railcar inside the terminal is empty and now has a bill of lading. It is scheduled to depart on the next serving carrier switch.
Storage:
PS—In-Plant Storage
Railcar is to be relocated inside the terminal for storage.
OS—Off-Site Storage
Railcar is to be relocated outside the terminal for storage.
Cleaning/Repair
CL—Cleaning
Railcar is to be cleaned out of product, residue or heel.
TR—Test Required—on Rent
Railcar is in the terminal with a test required and is still well within the lease rider period. The decision to proceed with the test has been made.
TO—Test Required—Off Rent
Railcar is in the terminal with a test required and the lease rider is due to expire. The decision must be made whether or not to proceed with the test.
RR—Repair Required—on Rent
Railcar is in the terminal with repair required and is still well within the lease rider period. The decision to proceed with the repair has been made.
RO—Repair Required—Off Rent
Railcar is in the terminal with repair required and the lease rider is due to expire. The decision must be made whether or not to proceed with the repair.
IS—In-Plant Shopped
Railcar is in a repair facility within the terminal.
ES—External Shopped
Railcar is in a nearby repair facility but off the terminal property.

One objective of the arrangement as described herein is to collect, consolidate, organize and preserve the data information relevant to safe and efficient operations at rail car loading/offloading/storage terminals and to make that information available upon demand in a secure manner to operators, owners and inspection officials. To capture and preserve the inspection of rail cars through digital technology, including handheld field computers with integral GPS, camera, video and audio technology, to eliminate paper trails, human entry errors and to improve timeliness and completeness of critical information.

This Terminal Staging Process is a method of improving the safety and the efficiency of a rail car operations terminal ("the terminal") by means of collecting key information from various operations in digital formats, storing the information in a central data hub and then using that information for safety, security and optimizing purposes.

The central digital data hub is a database repository with designated formats of electronic data interface (EDI) standards for the input and output of events and records. The data hub has the ability to relate various railcar and terminal events so that all of the activity of any vehicle approaching, moving through or departing from a terminal can be captured and reported at any time.

By utilizing field wireless computer technology on and near the vehicles, real-time data can be collected into the data hub so that the terminal can then be optimized for efficiency, safety, security and performance.

Once a vehicle arrives at a terminal, there are various actions that may or must take place in predetermined sequences or stages in order to ensure that the vehicle is inspected, cleaned, stored, loaded or unloaded as required by operations. The skipping of a stage or the execution of stages in an incorrect sequence could result in expensive, hazardous or catastrophic consequences.

The arrangement herein utilizes technology of rugged industrial wireless apparatus to determine vehicle location, status, contents and stage sequence. The database repository and software applications monitors the vehicle staging to ensure correct and efficient sequences. The whole system manages the staging through the terminal, ensuring completion of one stage before moving on to the next stage and to determine the correct choices of the next stage. Each stage is fully documented in a digital format for record keeping and to ensure that the operations meet compliance with safety rules.

The rail car terminal facility staging process as described in more detail hereinafter is designed for, but not limited to:
Identifying the discrete steps of operations or the stages at a rail car terminal;
Identifying the valid options of stage sequences through a terminal;
Identifying and managing the mandatory and optional tasks at each stage before permitting the vehicle to advance to the next stage;
Using a User Interface Display ("UI") to monitor the progress and status of the vehicles at the various stages of a terminal, and to alert operators of any anomalies;
Measuring the performance of each stage in a terminal, for throughput, efficiency, task completion and error reduction;
Integration of digital wireless computerized field equipment for real-time data collection from each of the stages.

The objective of the system as described hereinafter is to manage the transition of the railcar at a facility, from arrival, through un/loading and then either storage or departure. The operator can be an order processor, shipping clerk, terminal manager or traffic coordinator. The system handles logistics, terminal performance and financial verifications.

The main objectives are:
One-screen access to moving railcars through the stages at a terminal,
Simplify all the steps in handling a railcar for arrival processing and release,
One-step process for connecting railcars to orders, billings and products,
Coordinate and control the details of railcar operations, including inspection, cleaning, loading, transloading or offloading, storage fees, documents such as bills of lading and hazardous materials,
Measure the performance and capabilities of terminals,
Verify all relevant costs of operations, such as demurrage and storage,
Address the users' needs where Yard module is not a choice.

Each railcar will be flagged for staging through the processes of the yard. Staging is the sequencing of the movements of a railcar through a yard in order to accomplish tasks, such as loading, offloading, cleaning, inspection and storage.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
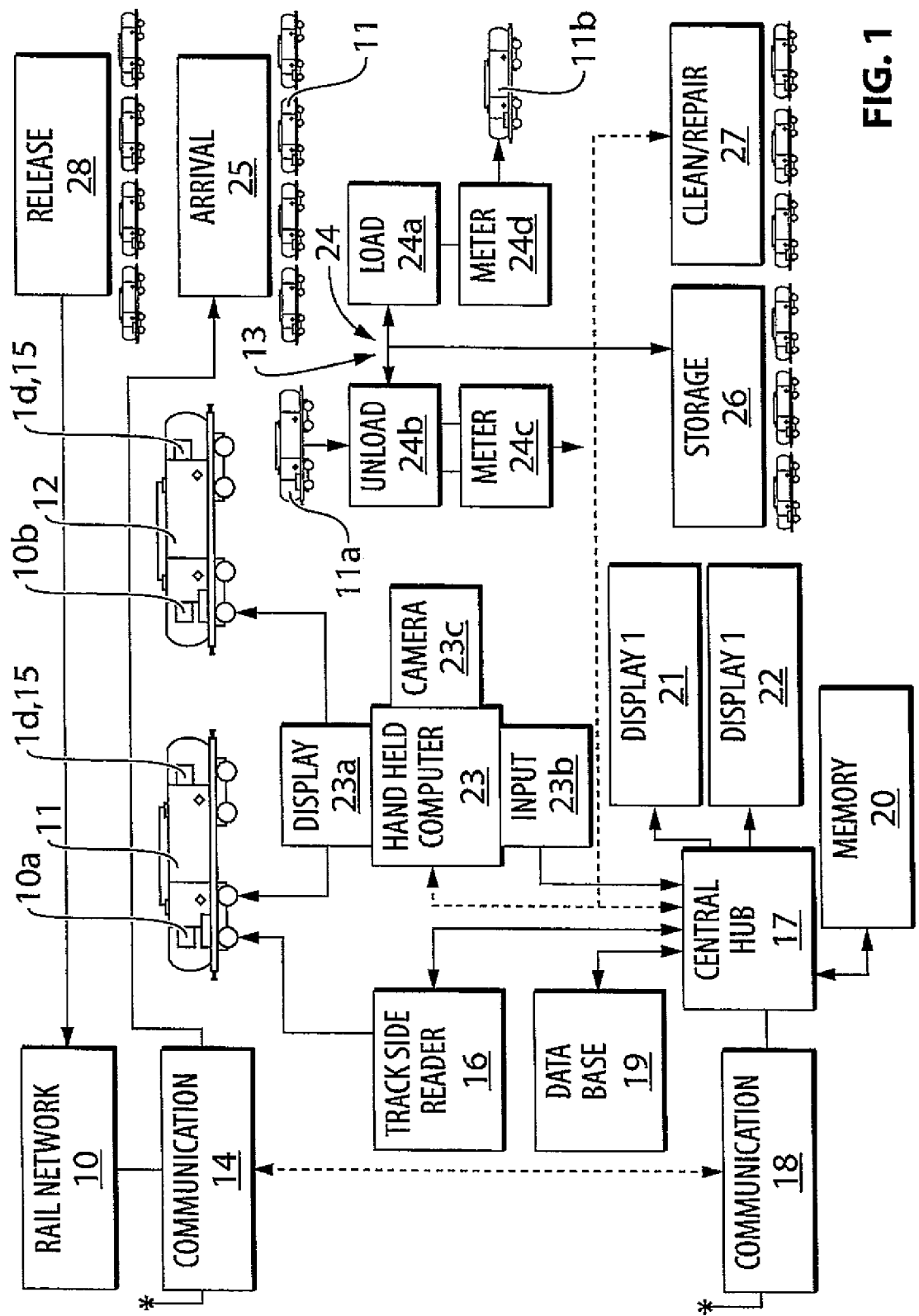
FIG. 1 is a schematic illustration of the components of a system according to the present invention.

The system shown in FIG. 1 comprises a rail network 10 for transporting railcars 11, 12 to different locations which include a remote location from which railcars on transmitted to the railcar terminal 13 term generally in FIG. 1.

The rail network is of course a conventional system in use for many years and includes many different protocols for operating the rail network including a communication system 14 which receives information generated by the network for communication to different users a different locations including the railcar terminal 13.

Each of the railcars 11, 12 includes a label indicating a unique identification code as indicated at 15. The code can be read by many different systems including bar codes and visual inspection for entry of that unique code into the control system of the terminal 13.

In some cases the apparatus disclosed herein for managing transportation vehicles includes a series of separate containers 10A, 10B each having a mounting arrangement for attachment to a respective one of the railcars 11, 12 at a suitable location on the railcar where it can be maintained safely from damage or tampering but is readily accessible on the exterior for repair.

In this situation, the system further includes track side reader devices 16 to be located at the shipping location and at the receiving location at the terminal 13.

Each container 10A includes a memory for storing received information, a transmitter for wirelessly transmitting required information from the memory when requested, a receiver for receiving a wireless request signal, a power supply and a control unit which operates the functions and acts to write data into the memory and to retrieve it from the memory when required, all stored within a secure outer shell. The control unit acts as a reader/writer for storing data in the memory.

In one mode of operation of the first reader device, it is arranged to provide an output on a display of all vehicles within the transmitter range to indicate imminent arrival of the vehicles at the location of the first reader device. This can be operated with the GPS system for detecting a current location of the container on the vehicles to be transmitted and displayed.

Further details of an arrangement of this type are disclosed in pending Canadian application 2897787 published Mar. 17 2016 under the title "Apparatus for managing transportation Vehicles", the disclosure of which is incorporated herein by reference.

The control system of the terminal 13 includes a central data hub 17 which is a programmed computer system operable to manage the different aspects of the terminal on the railcars passing through the terminal. The central data hub 17 includes a communication system 18 for communication with the exterior including particularly the communication system 14 of the rail network and also where necessary with exterior sources of information using a required communication system such of the Internet. The central hub 17 further includes access to a database 19 of information either as part of the central hub 17 or at a remote location through communication systems. The computer system further includes a memory 24 storing and retrieving information generated by the other components of the system for use in the management of the whole system is controlled by the central hub 17. The control system further includes displays including display 21 and display 22 for displaying information to various users of the current status of the system and all the specific instructions and requirements as generated by the control system.

In this way the central hub 17 can receive from the communication system 14 of the rail network a car location message (CLM) for each of the railcars prior to arrival of the railcars and the terminal 13. In the same way the central hub can receive for each of the railcars a waybill relating to the load on the railcar and the destination for that load. The CLM and the waybill are conventional systems weld used in the rail network and containment standard information for use in management of the rail network.

The central hub 17 further obtains from the database 19 using the unique identification information 15 from the railcar, mechanical data relating to the respective railcar including at least the weight of the railcar concerned and the capacity of the railcar. In many cases this information is available within a database at the terminal. In other cases where the information is not available on that database, the information can be obtained by an external communication with a remote database which contains the required information for all existing railcars. This using either system as required, the central hub obtains the mechanical data above concerning the railcar enroute to the terminal 13.

Also the system includes a plurality of hand-held input computers 23 which communicate wirelessly with the central hub 17. These are arranged to be carried by workers operating in the terminal 13 to provide information and instructions to those workers and to receive the data input by the workers. Thus each input computer includes a display 23A, a keyboard input 23B on the camera module 23C. The hand-held computer 23 further contains enough processing power to communicate data to and from the central hub 17 and to operate the components for communication with the worker and for obtaining and transmitting images generated by the camera module 23C together with the GPS for spatial location.

The terminal further includes a loading and unloading station generally indicated at 24 which includes one or both of a loading apparatus 24A and unloading apparatus 24B. The unloading apparatus includes a meter 24C for metering the material as it unloads from the railcar 11A. The loading apparatus includes a meter 24D for metering the material as it is loaded in two the railcar 11B. The loading and unloading apparatus is controlled by the central hub 17.

The terminal further includes an arrival stage generally indicated at 25 after which the railcars from the rail network are entered as an initial physical location of the railcars 11. In addition the terminal further includes a storage stage 26 and a clean/repair stage 27. Yet further the terminal includes a release stage 28.

Both the control unit provided by the central hub 17 acts to establish a plurality of the stages of operation on the railcars including: arrival from the rail network; loading/unloading; storage; cleaning and/or repair; and release to the rail network.

As explained herein, the central control provided by the hub 17 acts to control the transfer of the relevant railcar from one stage to the next stage. This control is dependent upon, in some cases, an inspection carried out by the worker carrying the hand-held computer 23. But is that, in between at least some of the stages, the control 17 instructs the worker to carry out an inspection of the railcar concerned and data relating to the inspection into the input interface 23B of the portable computer.

In many cases the inspection as controlled by the control hub 17 includes a checklist of items to be inspected including the mechanical condition of the railcar, a confirmation that the railcar inspected is the correct car identified by the unique ID code and a confirmation of the load contained by the railcar inspected. The checklist can include many other items that need to be inspected including the presence of seals, the mechanical condition of the various components of the railcar.

From the information defined above which has been collected by the central hub 17 from the various sources defined above, the central hub generates data indicating current stage of each of the railcars within the railcar handling terminal 13. The central hub thus monitors the passage of the railcar through the terminal from one stage to another depending upon the processes required on that particular railcar for the load concerned. In particular the central hub 17 generates a signal indicative of the railcar can be transferred from one stage to the stage based upon the data defined above concerning the CLM, the waybill, the mechanical data and the inspection or inspections.

In order to control the movement of the transfer of the railcar from one stage to another stage, in most cases this is controlled by providing an indication to the worker on the portable computer that the railcar, transferred from one stage to another stage. In some cases this involves a physical movement of the railcar which is carried out under the control of the worker and with the permission signals generated by the central hub 17. In other cases the railcar remains at a constant location and the transfer from one stage to another stage is in effect a control condition generated by the control hub. In this way the control hub 17 has data defining the current stage of each of the railcars together with the rules which allow that railcar to transfer to the next stage. Of course also the rules define the next stage to be entered depending upon the requirements for that railcar on the condition of the railcar.

For example, the control hub 17 controls the loading or unloading of the railcar after the railcar has entered that stage by sending control signals to the specific loading or unloading device and particularly the metering component of that device. The hub 17 can control the loading apparatus by providing a signal to the metering component of an amount of boat goods to be metered into the railcar sufficient to reach a full condition of the railcar. In some simpler cases, the control of the fill level can be provided by communicating fill information to a handheld computer of a worker at the loading system who manually controls the metering component.

As part of the operation of the control hub 17, at the release stage of 28, the control hub generates a waybill or bill of lading for the railcar concerned prior to release of the railcar from the release stage 28. Also as part of this release protocol at the release stage 28, the hub 17 generates a CLM for the railcar.

As a part of the operation of the control hub 17, the hub generates a CLM for each stage which is internal to the terminal rather than external to the rail network for use in managing the railcars as they pass through the different stages of the terminal 13.

The hub 17 further controls the passage of the railcars from one stage to another dependent upon the condition of the cause. For example the hub 17 allows loading of a railcar in dependence upon information relating to a previous load of that railcar as obtained from the waybill detected prior to arrival of the railcar at the terminal. In some cases the new load to be entered is compatible with the previous load so that the railcar may move directly from unloading to loading. In other cases the loads are incompatible requiring movement of the railcar to the cleaning stage 27. In yet other cases the information that available to the hub 17 from inspections and from the other communications indicates that the railcar concerned requires a repair or other service so that the railcar must be moved to the section 27 for that activity. In yet other cases, the hub causes that the transfer of a railcar to the storage stage 26 is dependent upon information obtained by the hub 17 from the inspections or otherwise for example relating to a repair condition or to an off lease condition of the railcar.

Figure 2:
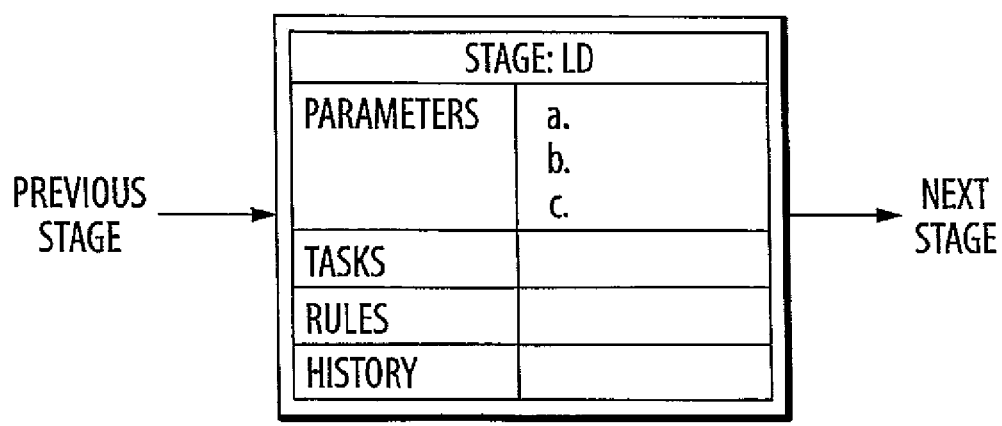
FIG. 2 is a block diagram of the properties of a stage to enable a rail car to move from one stage to another in the system of FIG. 1.

As shown in FIG. 2 there is a schematic illustration of the operation of control hub 17 in transfer of a railcar from a previous stage of to a next stage. In this case the control hub obtains information relating to various parameters of the railcar as defined above to get the tasks necessary for that railcar. This information is related to a series of rules, taking into account the history of operation of the railcar concerned to establish whether the railcar concerned, moved to the next stage. In addition the same algorithm can determine which stage should be entered next. As set forth above in some cases a railcar may be moved from unloading to repair or to storage or to the loading station. The selection is made by the control hub 17 depending upon the above conditions and parameters.

Figure 3:
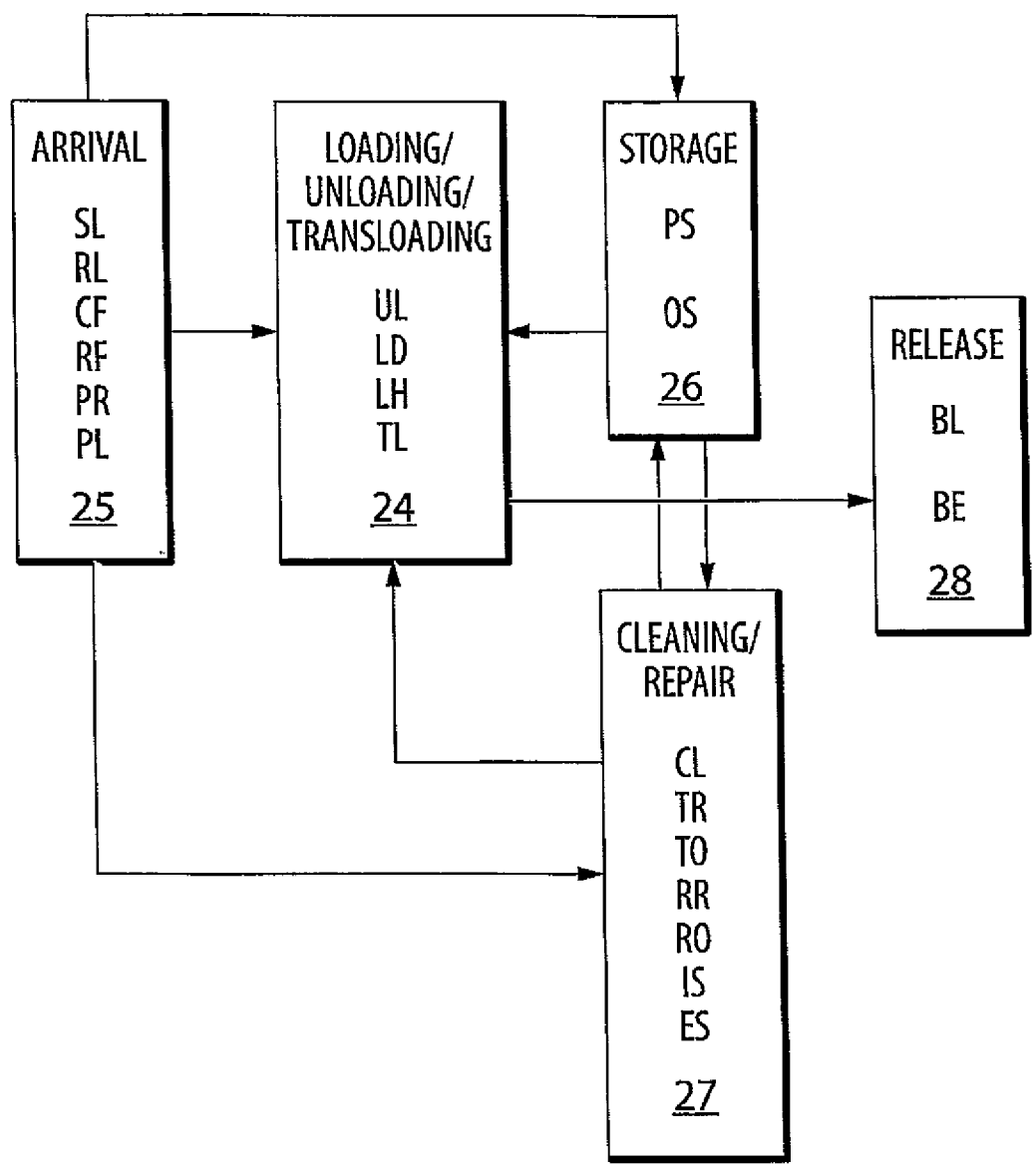
FIG. 3 is diagram showing potential paths between stages.

As shown in FIG. 3, each of the stages includes a plurality of sub-stages. Thus the arrival stage includes a series of possible alternatives of the railcar concerned as defined above. Depending upon the above alternatives and the inspection is carried out, the railcar concerned can be moved to a selected one of the stages of 24, 26, 27 or 28. From the stages 26 and 27, the car can be moved to the stage 24 in the event that the railcar is available, in ready condition and is required.

Figure 4:
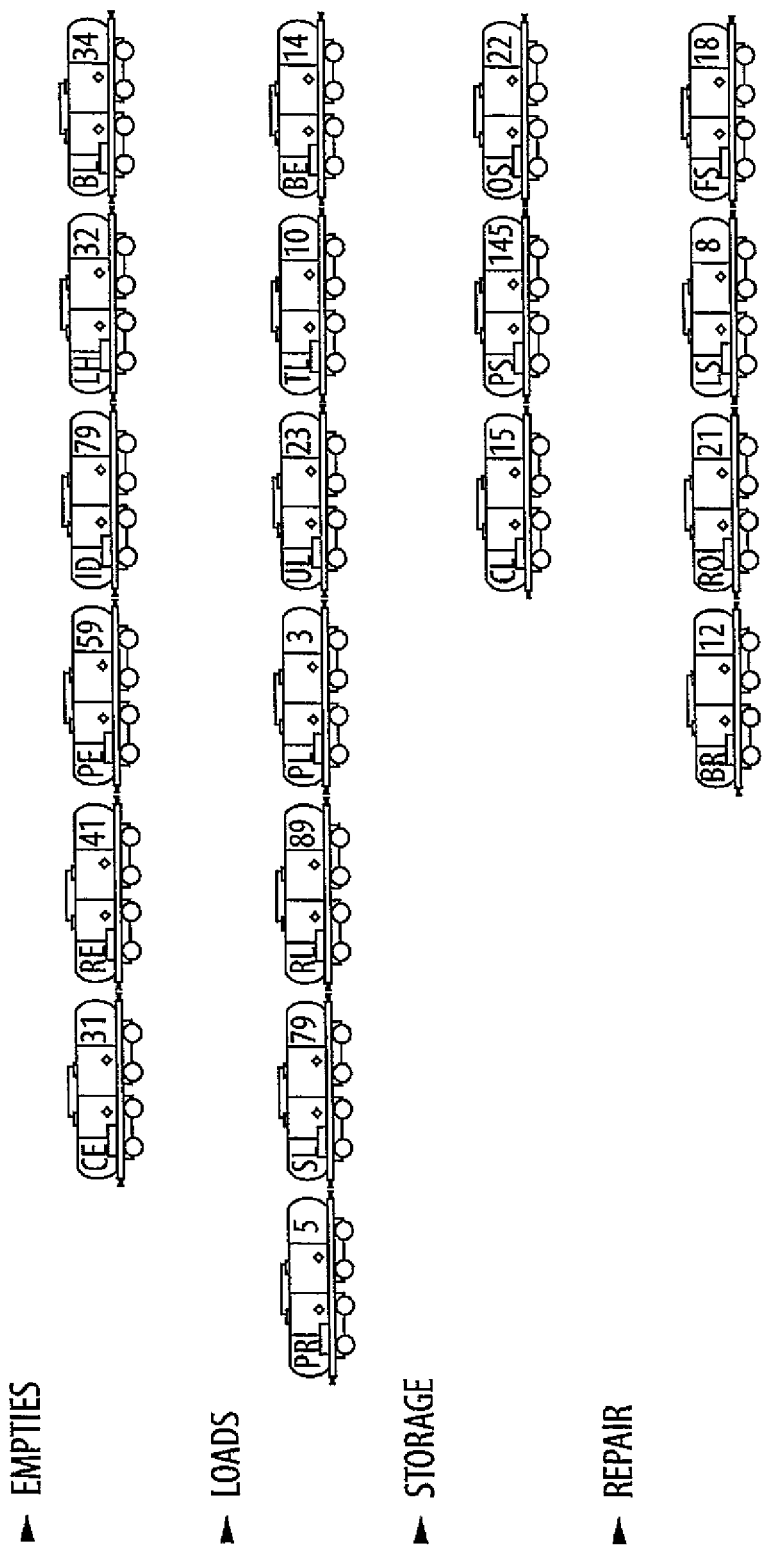
FIG. 4 is an illustration of one display of the system on the system of FIG. 1.

As shown in FIG. 4, one display screen capture of the control hub 17 on one of the display elements 21, 22 is shown which indicates for each of a series of stages the number of railcars in that stage together with an identification number identifying the particular railcar concerned.

As set forth above, the status of rail cars approaching or at a rail terminal can be defined as one of twenty-two distinct stages. The arrangement herein uses electronic digital devices and databases to identify the current stage of a rail car and to control and monitor the vehicle's progress through the required stages for a successful outcome.

Each rail car terminal utilizes at least two and possibly up to twenty-two stages for processing the rail cars. The selection of the stages is dependent on several factors, including the type of rail car, the type of cargo, the facilities at the terminal, the configuration of the terminal plus other factors.

The sequence of the rail cars through the stages at a terminal is controlled by rules that are pre-set by the operators at the terminal. The Terminal Staging Process ensures that the right rail car is moved to the correct next stage in a safe manner and that the previous stage was executed completely and all documentation was captured and stored electronically.

Each stage has the capability of receiving and storing the rules that govern whether a rail car can move to that stage, what tasks are to be performed by or on that rail car at that stage, when a rail car can exit a stage and the options of selecting the next stage. These are stored in the data hub.

The database is the repository for all of the rules governing the parameters of the stages.

The rail terminal administrator has access to a UI display for selecting and adjusting the stage parameters as necessary. Terminal operators have a UI display for showing the count of railcars positioned at the various stages and have software tools for requesting the advancement of the rail cars through the terminal.

One feature of the apparatus is the handheld computer tablet at the location of inspection of the rail car. The computer tablet is an industrial rugged device which includes built-in GPS locating, camera, calendar/clock, bar code scanner, wireless communications and proprietary inspection sheet software.

One novel feature of this design is the integration into rail car inspection sheets of the features of GPS, camera, audio, date/time stamp and wireless communications.

The check list defined for the worker by the hand held computer is capable of, but not limited to:

Recording all key information on the mechanical status of a rail car through a simple check list entry screen Capture the geographical location, date and time of a rail car inspection and the identification of the rail car inspector.

Capture digital images of each step of the rail car inspection, for either mandatory or elective events or features.

Capture still image, video and/or audio information at the point of inspection in the terminal yard.

Store all digital images, audio and video information, linked to the specific physical feature of each rail car, for future reference, comparison and regulatory requirements.

Ensure that each and every rail car has been fully inspected and meets regulatory compliance.

Inspecting rail cars during the trans-loading operation, to ensure the right railcar with the right safety requirements is being loaded or offloaded with the appropriate product to the appropriate volume or weight for that railcar and that all safety features are in place and are operational.

Capture by image and data entry all safety equipment, including the closure of valves, inspection and access hatches.

Capture the identification of security seals by optical reading of imbedded bar code identification.

Transfer the captured digital information with the terminal digital data hub through a wireless connection where available; otherwise through an Ethernet cable connection.

The rail car terminal digital data hub is a central data repository that may be, but not necessarily located at the terminal itself. The function of the hub is to be a collection database for all information that involves and defines the functions of rail cars passing through terminals, and includes but is not limited to:

Tracking the locations and the estimated times of arrival (the "ETA's") of rail cars inbound to the terminal.

Identification of rail cars upon arrival at the terminal, usually by stationary trackside RFID tag reader stations.

Capture of the bills of lading or waybills on the cargo on board the rail cars.

Capture of the inspection sheets of arrived rail cars through the handhelds.

Assignment of the rail cars to the various stages of operations inside the terminal, such activities including inspection, loading, offloading, cleaning, servicing, testing, storage and more.

Monitoring and capture of product trans-loading into or out of the rail car, including volumes, weight, density, temperature, loading factors, hazardous cargo properties and more.

Capture and retention of various mechanical properties of the rail cars, such as type, length, height, tare and gross weights, volumetric capacity, service schedules, outage tables, safety and service valves and other features.

Documentation preparation and retention, such as loading and offloading instructions, bills of lading, customs clearance, material safety data sheets (MSDS) and transportation of dangerous goods sheets (TDG), rail car switching lists and inspection sheets.

The collected data in the digital data hub is stored, organized, collated and indexed. The historical information is available for various measurements, such as terminal throughput performance, optimization, and verification of safety standards such as full rail car inspections, rail car service and repair scheduling and for the preparation of key performance indicators (the KPI's") of terminal operations.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for managing rail cars in a rail car handling terminal comprising:

providing a plurality of rail cars arranged to be transported on a rail network to a rail car handling terminal;

each rail car having unique identification indicia identifying the rail car;

the rail network having a communication system including for each rail car a Car Location Message (CLM) for each of the rail cars;

the rail car handling terminal including a plurality of rail tracks onto which the rail cars can be moved;

at the rail car handling terminal providing a center control data hub;

communicating from said center control hub to the communication system of the rail network to obtain from the communication system the Car Location Message (CLM) for each of the rail cars prior to arrival of the rail cars at the rail car handling terminal;

communicating from said center control hub to the communication system of the rail network to obtain from the communication system a way bill for each of the rail cars prior to arrival of the rail cars at the rail car handling terminal, the way bill including information on a point of origin of the rail car and on goods contained within the rail car;

the center control hub obtaining, from a data base using the unique identification indicia, mechanical data relating to each of the rail cars including at least a weight and capacity of the rail car;

at the rail car handling terminal providing a plurality of portable hand held field computers, each comprising:
an input interface for manual input by a worker of data relating to the rail cars;

a display for displaying data to the worker;
a camera module for obtaining images of the rail cars by the worker;
at the rail car handling terminal dividing the terminal into a plurality of separate stages of operation on the rail cars, the stages including at least the following:
arrival from rail network,
loading/unloading;
storage;
cleaning and/or repair;
release to rail network;
at the rail car handling terminal providing a loading apparatus for loading bulk goods into selected ones of the rail cars;
the center control hub including an output for providing a load signal to a load metering device of the loading apparatus for measuring an amount of bulk goods to be loaded by the loading apparatus;
at the rail car handling terminal providing an unloading apparatus for unloading bulk goods from selected ones of the rail cars;
the center control hub including an iput for receiving an unload signal from an unload metering devide of the unloading apparatus for measuring an amount of bulk goods unloaded;
storing in the center control hub data indicating a current stage and condition of each of the rail cars in the rail car handling terminal;
before moving a selected rail car from a first stage of the separate stages, communicating from the center control hub to a selected one of the portable computers a prompt requiring the worker to carry out an inspection of the selected rail car in the first stage and to enter data relating to the inspection of the selected rail car into the input interface of the portable computer;
using the field computers to obtain and enter mechanical data on physical properties and condition of the selected rail car;
the center control hub using established rules contained in the control hub to provide a signal indicative of a selected one of the stages as a next stage into which the selected rail car should be transferred from said first stage based on at least some of the data relating to the Car Location Message, the way bill, the mechanical data and the inspection;
using the field computers to obtain and enter data to determine whether the selected rail car is situated and in a suitable condition to safely move into the next stage;
the center control hub using said established rules contained in the control hub to provide a signal indicative that the selected rail car meets the rules to be transferred from said first stage to said next stage based on at least some of the data relating to the Car Location Message, the way bill, the mechanical data and the inspection;
the center control hub communicating the signal indicative that the selected rail car is to be transferred from said first stage to said next stage to the portable computers to control transfer of the rail car from said first stage to said next stage;

the center control hub providing a signal allowing operation of the loading apparatus to load the selected rail car in the loading apparatus;
the center control hub providing a signal indicative of a loading amount of bulk goods to be metered to a full condition of the selected rail car;
the center control hub acting to provide a signal to prevent loading of the selected rail car with product that is not compatible with previous contents in the selected rail car.

2. The method according to claim 1 wherein the transfer from the first stage to the next stage includes physical movement of the selected rail car.

3. The method according to claim 1 wherein the center control hub controls metering to fill of the selected rail car by communicating fill information to the hand held computers.

4. The method according to claim 1 wherein the center control hub creates bill of lading for the rail cars prior to release of the selected rail car from the release stage of the rail car handling terminal to the rail network.

5. The method according to claim 1 wherein the center control hub creates a Car Location Message (CLM) for each rail car prior to release of the selected rail car from the release stage of the rail car handling terminal to the rail network.

6. The method according to claim 1 wherein the center control hub creates a Car Location Message (CLM) internal to the rail car handling terminal for each rail car prior to release of the selected rail car from the arrival stage of the rail car handling terminal into the rail car handling terminal and upon transition from each stage to the next stage.

7. The method according to claim 1 wherein there is provided track side scanners at or in advance of the rail car handling terminal for reading data from each rail car including a location, way bill and Car Location Message (CLM).

8. The method according to claim 1 wherein the input interface of the portable hand held field computer creates an inspection check list for the worker.

9. The method according to claim 1 wherein the center control hub provides signals requiring cleaning of the selected rail car prior to loading dependent on information relating to the previous contents obtained from a previous way bill.

10. The method according to claim 1 wherein the center control hub provides signals allowing transfer of the selected rail car to the storage stage dependent on information from the inspection including a requirement for repair and/or an off-lease condition of the selected rail car.

11. The method according to claim 1 wherein the center control hub stores for each rail car in the release stage information relating to identification of the rail car, load in the rail car, inspections carried out on the rail car and photographs of inspected parts of the rail car.

12. The method according to claim 1 wherein the center control hub maintains a list of customer orders.

13. The method according to claim 12 wherein the center control hub selects for each customer order a required rail car for the order dependent upon mechanical data obtained from the data base and the previous contents obtained from the way bill.

* * * * *